United States Patent
Rosa et al.

(10) Patent No.: US 6,863,223 B2
(45) Date of Patent: Mar. 8, 2005

(54) FLUID APPLICATION SYSTEM AND METHOD

(75) Inventors: Andy Rosa, Naperville, IL (US); Paul Wilson, Canton, GA (US)

(73) Assignee: Andres (Andy) Rosa, Naperville, IL (US)

( * ) Notice: Subject to any disclaimer, the term of this patent is extended or adjusted under 35 U.S.C. 154(b) by 73 days.

(21) Appl. No.: 10/039,889

(22) Filed: Oct. 19, 2001

(65) Prior Publication Data

US 2003/0080200 A1 May 1, 2003

(51) Int. Cl.$^7$ .............................................. A01G 27/00
(52) U.S. Cl. ............................ 239/67; 239/68; 239/69; 239/70; 239/1; 239/8
(58) Field of Search ............................ 239/67, 68, 69, 239/70, 1, 8, 10, 11, 99, 722, 726, 237, 240, 242, 243, 255, 263, 263.1; 134/18, 56 R, 57 R, 123, 180, 181

(56) References Cited

U.S. PATENT DOCUMENTS

| | | | |
|---|---|---|---|
| 2,981,266 A | * | 4/1961 | Tamburri .................... 134/72 |
| 3,891,149 A | * | 6/1975 | Rendemonti ................ 239/70 |
| 3,908,219 A | | 9/1975 | Chapman et al. |
| 4,369,801 A | * | 1/1983 | Jones et al. ............... 134/58 R |
| 4,718,439 A | * | 1/1988 | Gorra et al. ............... 134/57 R |
| 4,739,779 A | * | 4/1988 | Jones et al. .................... 134/45 |
| 4,784,166 A | | 11/1988 | Brager et al. |
| 4,949,423 A | * | 8/1990 | Larson et al. .............. 15/316.1 |
| 5,161,557 A | * | 11/1992 | Scheiter, Jr. ............. 134/57 R |
| 5,255,695 A | * | 10/1993 | Downey .................... 134/123 |
| 5,348,226 A | | 9/1994 | Heiniger et al. |
| 5,447,574 A | * | 9/1995 | Inoue .......................... 134/18 |
| 5,806,542 A | | 9/1998 | Hoffer et al. |
| 5,886,648 A | | 3/1999 | McElroy et al. |
| 5,901,398 A | * | 5/1999 | Ishikawa et al. ............. 15/53.3 |

* cited by examiner

Primary Examiner—Davis Hwu

(57) ABSTRACT

A fluid application system for vehicle is provided. The system includes a fluid source, a pump in fluid communication with the fluid source, and a spray unit including a nozzle in fluid communication with the pump. A sensor is adapted to output a vehicle detection signal, and a controller is in operative communication with the sensor and the pump. The controller is adapted to receive the vehicle detection signal, delay a first time period, and activate the pump for a second time period to deliver the fluid source by way of the spray unit to a detected vehicle as a function of the vehicle detection signal. In one embodiment, the fluid source includes first and second fluid sources in fluid communication with the pump. A variable valve is also provided in-line with the first fluid source for varying the mixture ratio of the first and second fluids to the vehicle. The system is advantageous in applying asphalt release agent to the truck bed of a vehicle, for example.

38 Claims, 2 Drawing Sheets

FLUID APPLICATION SYSTEM AND METHOD

TECHNICAL FIELD

Figure 1:
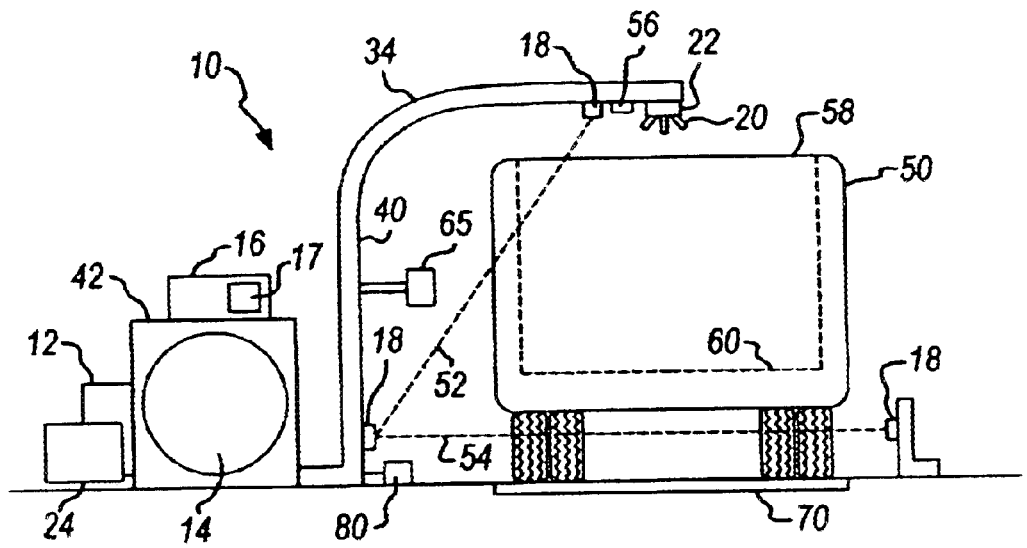

The present invention relates to a fluid application system and method, and more particularly concerns a method and system for the automatic application of a fluid mixture to the bed of transportation vehicles.

BACKGROUND

The process of paving roads, runways, parking areas and the like with asphaltic concrete (asphalt) involves the transportation of the asphalt from the manufacturing plant to the paving site. Numerous types of vehicles are employed to transport asphalt from the manufacturing plant to the paving site. These vehicles include tandem dump trucks, tri-axle dump trucks, dump trailers, live-bottom trailers, hopper trailers, center drop trailers, double trailers, and the like. The asphalt transported by these vehicles is received "hot" so that it is in a workable condition at the paving site. To prevent the asphalt from sticking or adhering to the bed of the transportation vehicle, a lubricating type material commonly known as asphalt release agent is applied to the truck bed prior to loading the asphalt.

The most common form of release agents are liquids which are sprayed or splashed or otherwise applied to the vehicle truck beds. One common method of spraying the truck bed with release agent is by the use of a pump-up sprayer. In such applications, a measure of release agent is placed into the tank of the pumping unit, diluted as required (typically with water), agitated, and then pressurized to a sufficient air pressure to spray the bed of the truck. The spraying is conducted by the vehicle operator or personnel at the asphalt plant controlling a wand or a nozzle to direct the flow of the spray unit. This method is somewhat ineffective in that the sprayers generally do not spray uniformally, and have decreasing air pressure while they are being used. Additionally, this method may require the vehicle operator or other personnel to climb up onto the truck bed, presenting obvious safety hazards.

Other conventional spray units operate in cooperation with a stand built to allow the driver or other personnel to be at truck bed level while applying the release agent. Spray units of this type may employ a pump or venturi (using water pressure, air pressure or both) to dilute the release agent and supply the necessary pressure to spray the diluted release agent through an appropriate nozzle. Such units also have numerous drawbacks, including the lack of control over the release agent concentration due to variability of water and/or air pressure, lack of uniformity of application, and time and safety risks associated with driver or personnel involvement in the application of the release agent.

Other pump type asphalt release agent applicators are available which require that the release agent be used neat or pre-diluted. The use of neat release agents is very expensive due to increased freight and handling costs. For example, to provide diluted release agent at a manufacturing site requires additional equipment both for transfer of the concentrate and the mixing process. Furthermore, the uniformity of the resulting mixture is often unsatisfactory.

Accordingly, there is a need for a system and method of applying release agent to the bed of transportation vehicles which does not require an operator to leave the vehicle, which recognizes the type of vehicle to which the agent is to be applied, which controls the amount and concentration of the release agent used, and effectively and efficiently sprays the bed of the vehicle.

SUMMARY OF THE INVENTION

The present invention provides a new and improved fluid application system and method. In one embodiment, a fluid application system for vehicle is provided. The system includes a fluid source, a pump in fluid communication with the fluid source, and a spray unit including a nozzle in fluid communication with the pump. A sensor is adapted to output a vehicle detection signal, and a controller is in operative communication with the sensor and the pump. The controller is adapted to receive the vehicle detection signal, delay a first time period, and activate the pump for a second time period to deliver the fluid source by way of the spray unit to a detected vehicle as a function of the vehicle detection signal. In another embodiment, the fluid source includes first and second fluid sources in fluid communication with the pump. A variable valve is also provided in-line with the first fluid source for varying the mixture ratio of the first and second fluids to the vehicle.

One advantage of the present invention is that it provides an automatic system for applying release agent to the bed of a transportation vehicle. Another advantage is that it controls the concentration of the release agent applied to the vehicle truck bed. Another advantage of the present invention is that it effectively and efficiently applies release agent to the bed of a vehicle.

Other advantages and features of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 1 is a side view of an automatic fluid application system according to one embodiment of the present invention.

FIG. 2 is a schematic block diagram of the automatic fluid application system of FIG. 1.

FIG. 3 is a logic flow diagram of a control method for an automatic fluid application system according to one embodiment of the present invention.

DETAILED DESCRIPTION OF THE INVENTION

While the present invention is described with respect to a method and apparatus for automatically spraying a release agent mixture to the bed of an asphalt transportation vehicle, the present invention may be adapted to be used in other vehicle spray systems such as applying release agent mixtures to concrete transportation vehicles. Further, in the following description, various operating parameters and components are described for one constructed embodiment. The specific parameters and components are included as examples and are not meant to be limiting. Also, terms such as "vehicle bed" and "release agent" are not meant to be limiting. Thus, "vehicle bed" includes that portion of a vehicle used to haul the material under consideration and includes the entire box unless only a portion of the box is referred to such as the sides or floor. Similarly, "release agent" is used in the example of the disclosed embodiment to represent any fluid concentrate to be mixed with a carrier fluid.

Figure 2:
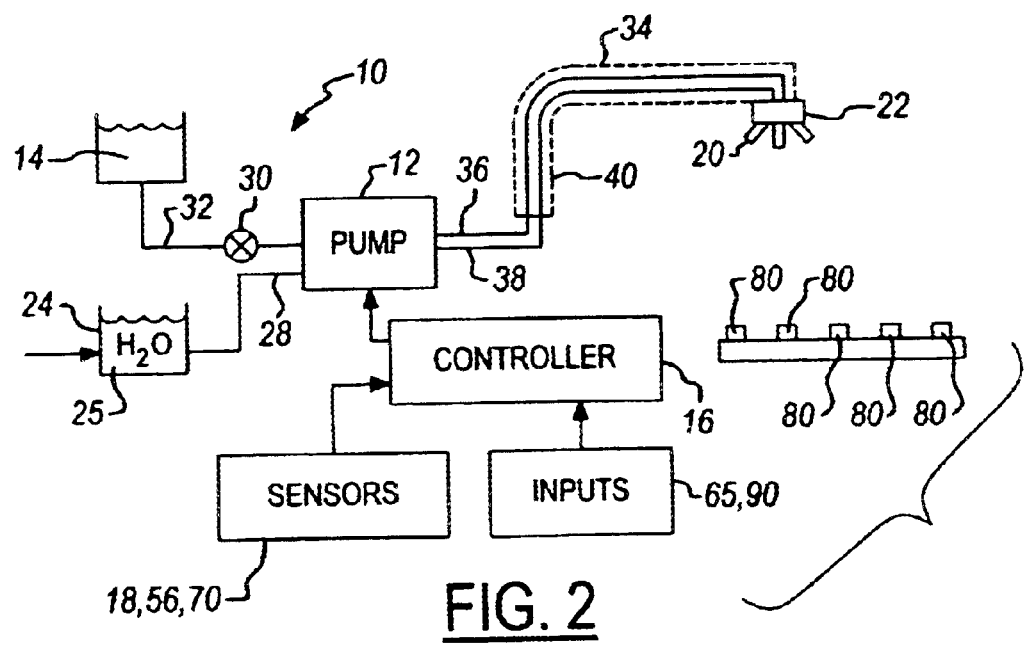

Referring now to FIG. 1 there is shown a side view of an automatic fluid application system according to one embodiment of the present invention. FIG. 2 shows a schematic block diagram of the automatic fluid application system of FIG. 1. The system 10 includes a pump 12, a release agent reservoir 14, a controller 16, sensors 18, and spray unit 34 including a boom 40 having applicators such as nozzles 20 carried on manifold 22. The pump 12 is in fluid communication with a second fluid source 24 such as a water supply for mixing with the release agent concentrate in reservoir 14. The water supply 24 may include a reservoir 25 to act as a buffer to ensure an adequate water supply to pump 12 during spraying applications. Reservoirs 14 and 25 may be a drum, an intermediate bulk container or a storage tank, for example.

The pump unit 12 is a centrifugal pump, a gear pump, a diaphragm pump, a plunger pump, a piston type pump, or the like suitable for the particular application under consideration. The pump may be operated by an electric motor, fuel engine, air pressure or hydraulic system. Auxiliary components such as valves and conduits to receive the release agent from reservoir 14 and mixing fluid from supply 24 or reservoir 25 are also included.

One example of pump 12 is a pump capable of producing a pressure between 200 psi and 3,000 psi for a flow rate of between approximately 4 gallons per minute and 12 gallons per minute. In another example, pump 12 is a piston type pump producing 800 psi of pressure and a flow rate of 8 gallons per minute. In applications where the pump 12 delivering only a single fluid, i.e. a pre-mixed release agent, to the nozzles 20, the conduit 28 to the second fluid supply 24 would not be necessary.

In applications where the pump 12 is mixing two fluids, one from reservoir 14 and another from source 24 to achieve a desired dilution ratio, a metering valve 30 is included in the conduit 32 between the pump and the fluid to be mixed such as concentrated release agent in reservoir 14. Valve 30 can be a programmable two-way valve capable of operating at one of two flow rates depending upon the desired dilution ratio of the release agent. Valve 30 can also be a variable flow control valve capable of operating at any desired flow rate in response to a control signal from controller 16. Valve 30 can also be a manually operated valve for providing a selectable dilution ratio for the first and second fluids.

In some applications wherein high fluid pressure is not required, the pump can be replaced by a control valve. The control valve, under the control of the controller, would turn on and off the flow from the respective first and second fluid reservoirs for delivery to the spray unit. The metering valve 30 in-line in conduit 32 could still be included to control the dilution ratio of the two fluid sources.

The spray unit 34 includes appropriate piping or conduits to convey the fluid mixture from the pump 12 to the manifold 22 and nozzles 20. In one embodiment, the pump 12 conveys fluid to the manifold 22 by high-pressure hoses 36, 38. Each hose 36, 38 carries a release agent mixture of differing dilution ratios. Thus, when two-way valve 30 is in a first position, conduit 26 conveys the resulting fluid mixture to the nozzles; and when valve 30 is in a second position, conduit 38 conveys the resulting fluid mixture to the nozzles. In this way, it is ensured that each vehicle bed receives the proper concentration of diluted release agent and does not receive the release agent mixture of the prior vehicle which would otherwise be remaining in the conduit between the pump and the nozzle.

The spray unit 34 includes an arch or boom 40 which may be a pipe of 2.5 to 8.0 inches in diameter and constructed of plastic, aluminum, steel or stainless steel. In one embodiment, the boom 40 is a steel pipe 3.5 inches in diameter and 21 feet in length, bent approximately 90° such that the clearance between the end of the pipe supporting the manifold 22 and the ground is approximately 13 feet. Of course, numerous other arch configurations can be constructed to accommodate the vehicles intended for the fluid application. Thus, the boom 40 could also be in an arch configuration or an H-configuration or a boom configuration of less than 90° extending from the support structure 42 of the system.

Referring to FIG. 2, a plurality of guiding lights 80 are positioned parallel to the direction of travel of the vehicle to pace the vehicle operator through the sprayer system. In one embodiment, guiding lights are located at distances of 8, 16, 20, 24, and 32 feet from the spray unit and are activated sequentially to pace the vehicle under the spray unit. In this way, the vehicle operator need only monitor the driver door approximately aligned with the activated guiding light to ensure a substantially even and thorough coating of the vehicle bed.

In another example of the fluid application system, the pump 12, first fluid reservoir 14, controller 16 and spray unit 34 are all attached to support structure 42 such that the entirety of the system 10 can be readily moved to any location at the asphalt manufacturing plant. The portable structure includes external connections to operate the components carried thereon such as connections for water, electricity, and/or air.

The spray unit 34, at one end, supports the manifold 22 and nozzles 20. Although a single nozzle may be sufficient for some applications, a plurality of nozzles is preferred. In the example shown in FIGS. 1 and 2, three nozzles 20 are provided. Each nozzle may be of various designs to provide a desired spray pattern for delivering the fluid to coat the bed of a vehicle without producing wasteful mist or overspray. The spray patterns may include flat or cone-shaped spray or streams depending upon the spray angle of the nozzle. The nozzle 20 may also be angled with respect to the manifold 22. As shown in FIGS. 1 and 2, two nozzles are angled with respect to the manifold 22 and one is pointed straight down towards the vehicle bed 50. The nozzles may be fixed, rotary-type or oscillating. One example of a nozzle is a rotating nozzle of approximately 0.035 to 0.090 inches, with a preferred opening of 0.065 inches, and a zero degree spray pattern. In a multi-nozzle arrangement such as shown in FIGS. 1 and 2, three nozzles may be provided spaced approximately one inch from each other with the middle nozzle 90° to the manifold surface and the outer nozzles approximately 65° to the manifold surface such that the spray pattern of the outer nozzles is directed away from that of the middle nozzle.

The sensors 18 include vehicle detection devices to detect the presence of a vehicle and/or the type of vehicle approaching the spray unit 34. In one embodiment, the sensors 18 are light sensors which use light (laser, ultra violet, visible, or infra red) to detect the presence of a vehicle. Such sensors may be "electronic eye"-type sensors wherein a transmitting and receiving unit is employed to monitor whether a light path such as path 52 or path 54 is broken (interrupted) by the presence of a vehicle. In another embodiment, the sensing device may include a distance sensor 56 to detect the presence and profile of the vehicle bed 50. One example of a distance sensor is a proximity sensor. In this way, distance sensor 56 can be used to distinguish between the top 58 of the vehicle 50 and the bed floor 60 of the vehicle 50 to activate the spray unit 34 as described in more detail below. Distance sensor 56 may include an ultrasonic sensor, radar sensor, laser sensor, or the like. Sensors 18 may also include vehicle identification sensors such as radio tag and bar code readers to inform the controller 16 of the type of vehicle 50 present under the spray unit 34.

The controller 16 is in operative communication with the sensors 18, 56, valve 30, and pump unit 12 for detecting the presence of a vehicle 50 and activating the pump 12 to drive the spray unit 34 to apply fluid to the vehicle bed. The controller 16 includes an operator interface panel 17 for inputting vehicle information and/or displaying system information. The interface panel may be fixed or detachable. One example of a detachable interface panel is a laptop computer connected to said controller 16. The controller may be a microprocessor-based device such as a computer having associated memory (RAM and/or ROM), inputs, outputs and a communications bus. In one embodiment, controller 16 is a programmable logic controller (PLC) adapted to receive a plurality of inputs such as from sensors 18, 56, reservoirs 14, 25, and pump 12; and control a plurality of outputs such as to pump 12, sensors 18, 56, and metering valve 30 in accordance with a program.

In operation, the automatic fluid application system is activated upon the detection of a vehicle under the spray unit. Upon detecting the presence and/or profile of a vehicle from the sensor inputs, the system activates the pump unit as a function of time and/or the vehicle profile to apply the desired concentration ratio of release agent to the vehicle bed, and resets the system in preparation for the next vehicle.

Figure 3:
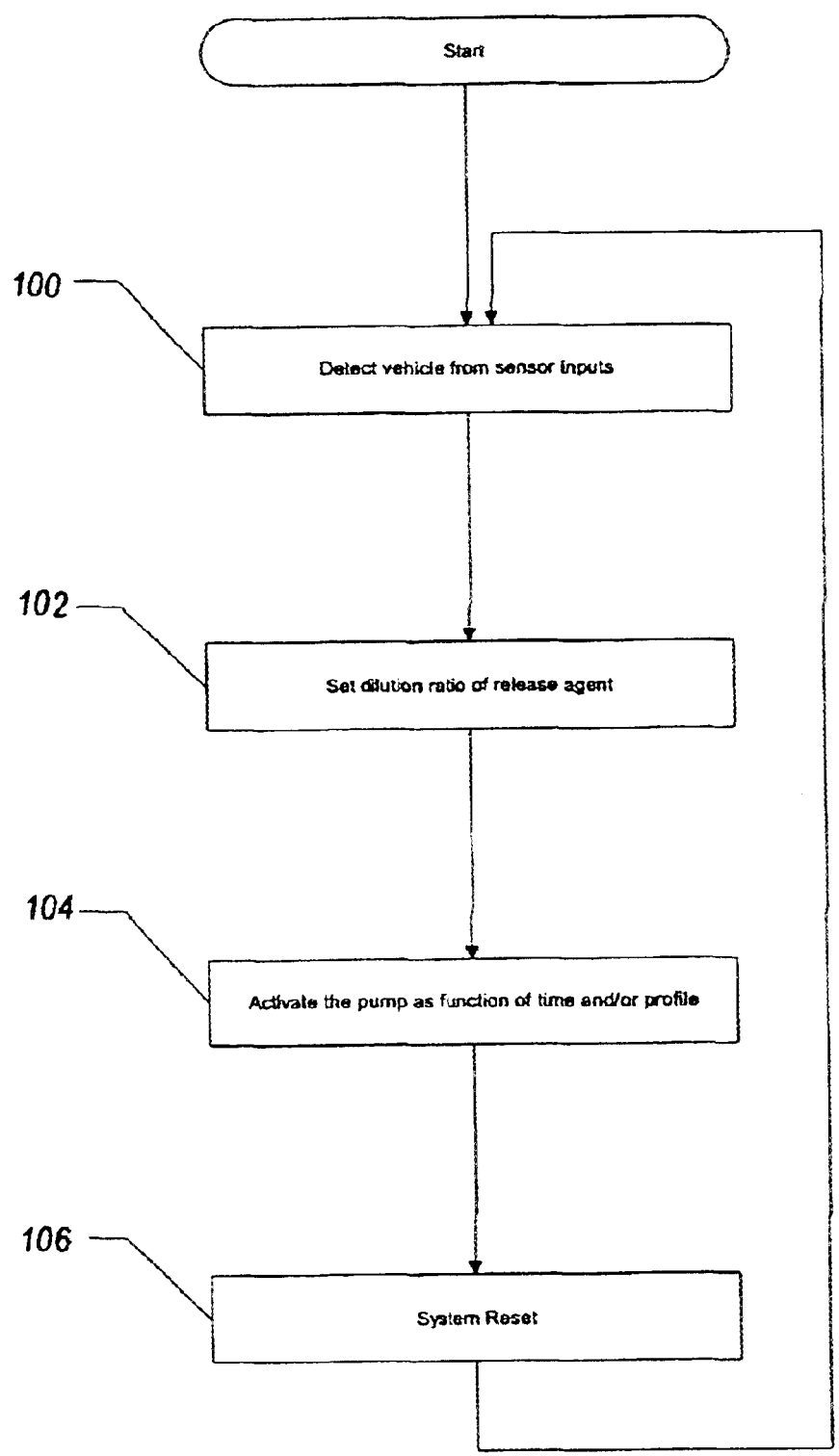

Referring now to FIG. 3 there is shown a logic flow diagram of a method of controlling the automatic fluid application system according to one embodiment of the present invention. The method of FIG. 3 will be described with reference to the system components shown in FIGS. 1 and 2. The logic resides in the controller and is executed for each vehicle passing through the automatic fluid application system.

The logic begins in block 100 wherein the system detects at least the presence of a vehicle under the spray boom. This is accomplished by receiving inputs from sensors 18. The type of vehicle may also determined from sensor 56 which may be, for example, an ultrasonic sensor capable of profiling the contour of the top and bed of vehicle 50. As mentioned above, one or more of sensors 18, 56 may also be radio tag readers or bar code systems capable of detecting the presence of and type of vehicle passing through the system. Sensors 18, 56 may also be inputs configured to receive vehicle type/profile data from other systems at the asphalt plant wherein vehicle data/type information is collected. In one example, a vehicle is not declared "detected" until the light-path of sensor 18 is interrupted for a predetermined period of time.

In block 102, the system sets the desired dilution ratio of the release agent to be applied to the detected vehicle. As mentioned above, the concentrated release agent 14 is drawn into the pump 12 through a programmable two-way valve 30 designed to vary the flow rate of the release agent into the pump between two preset values. In this way, the valve 30 can control the ratio of water to release agent from, for example, 15:1 in response to one control signal and 5:1 in response to a second control signal. In step 102, the controller activates the valve 30 to provide the desired flow rate of release agent to achieve the desired concentration ratio depending upon the identity of the vehicle, type of vehicle, and type of asphalt being transported. This information is either gathered from the sensor data in step 100, or input by the vehicle operator or asphalt plant personnel into the controller 16 by way of an operator input device 17. Alternatively, this information is gathered from other systems at the asphalt plant. Of course, although a two-way valve capable of only two different flow rates is disclosed in the present example, any variable valve responsive to a control signal can be used. A manually selectable valve can also be used to set the dilution ratio to a predetermined ratio.

In step 104, the pump 12 is activated by the controller 16 to deliver the release agent mixture to the spray unit 34 and onto the vehicle truck bed. The pump is activated as a function time and/or the type of vehicle or vehicle profile. In one embodiment, when the light-path of the sensor 18 is broken for a predetermined period of time, a first time period is initiated to delay the pump activation for between approximately 3 and 10 seconds to allow the cab portion of the truck to pull forward through the spray system. At the end of the first time period, the pump is activated for a second time period of between approximately 15 and 90 seconds, during which time, the vehicle is advanced beneath the spray unit to coat the vehicle bed with the release agent mixture. At the end of the second time period, or if the light-path of the sensor 18 is no longer broken, the pump is turned off.

In another embodiment, the pump 12 is activated as a function of the output of sensor 56 which is designed to detect the distance to the detected vehicle. In this example, the sensor 56 "looks" for the desired vehicle feature, i.e., the bed, before the controller activates the pump. Thus, as a vehicle passes under the spray unit 34, the sensor 56 will "see" the vehicle hood, then the vehicle cab, both of which will be too close to the sensor to allow pump activation. The vehicle bed is typically in the range of approximately 4 and 5.5 feet above ground level. Thus, as the truck pulls forward through the system, the sensor 56 will detect the sudden significant change in distance represented by the floor 60 of the vehicle truck bed and signal to the controller to activate the pump.

In another embodiment, the light-based sensor 18 can be set to detect a height of approximately 5.8 feet above ground level. In such a case the pump will only be activated when the sensor 18 detects the presence of a vehicle feature 5.8 feet high (most likely the sides of a vehicle bed) and the sensor 56 detects a vehicle feature between approximately 4 and 5.5 feet above ground level (most likely the floor of a vehicle bed). The pump can be deactivated upon the expiration of a timer and/or the activation conditions no longer being satisfied.

In step 106, the timers and system are reset in preparation for the next vehicle. In one embodiment, the system does not reset until the light-path of the sensors 18 is broken continuously for one to six seconds. This is to prevent the improper activation of the system upon the detection of a brief sensor interrupt. Another example of the reset routine may include closing the valve 30 after a vehicle has passed through the system and activation of the pump for a brief period to clear the spray unit and nozzles with water only. The system reset may also include setting a delay to prevent the immediate reactivation of the spray unit. This can be beneficial when it is necessary to replenish the water supply upon detecting that the fluid level in reservoir 25 is too low to spray the next vehicle. A similar low-agent sensor indication can be used to prevent system activation until reservoir 14 is replenished.

From the foregoing, it will be seen that there has been brought to the art a new and improved automatic fluid application system which has advantages over prior fluid application systems. While the invention has been described in connection with one or more embodiments, it will be understood that the invention is not limited to those embodiments. For example, two vehicles could be serviced simultaneously with the addition of another control valve and a second or elongated boom structure supporting corresponding additional sensors and nozzles. Accordingly, the invention covers all alternatives, modifications, and equivalents as may be included within the spirit and scope of the appended claims.

What is claimed is:

1. A stationary fluid application system for vehicle driven by an operator comprising:
   a fluid source;
   a pump in fluid communication with said fluid source;
   a spray unit including a nozzle in fluid communication with said pump;
   a sensor adapted to output a vehicle detection signal in response to vehicle movement under the control of the vehicle operator; and
   a controller in operative communication with said sensor and said pump, said controller adapted to receive said vehicle detection signal, delay a first time period during which time said spray unit is inactive and said vehicle is moving under operator control, and activate said pump for a second time period to deliver said fluid source by way of said spray unit to a detected vehicle as a function of said vehicle detection signal, and wherein said fluid source comprises first and second fluid sources in fluid communication with said pump, said pump adapted to receive said first and second fluid sources and communicate a mixture of said first and second fluid sources to said spray unit.

2. A fluid application system according to claim 1 wherein said nozzle is a rotary nozzle and said pump is a piston-type pump.

3. A fluid application system according to claim 1 wherein said spray unit comprises a boom supporting a plurality of nozzles at a first end, said boom configured to support said nozzles over a detected vehicle.

4. A fluid application system according to claim 3 wherein said sensor is located at said first end of said boom.

5. A fluid application system according to claim 4 wherein said sensor is a light-based sensor.

6. A fluid application system according to claim 4 wherein said sensor is an ultrasonic sensor directed underneath said first end of said boom and said controller activates said pump as a function of a vehicle profile signal received from said ultrasonic sensor.

7. A fluid application system according to claim 1 wherein said sensor is a light-based sensor.

8. A fluid application system according to claim 1 comprising a selectable valve between said first fluid source and said pump, said valve responsive to a valve control signal for modifying a flow rate of said first fluid source to said pump.

9. A fluid application system according to claim 8 wherein said valve is operable at two different flow rates and said controller is adapted to output said valve control signal to said valve in response to said vehicle detection signal.

10. A fluid application system according to claim 1 comprising a second sensor for communicating a type of vehicle signal, and said controller is adapted to activate said pump as a function of said detected vehicle signal and said type of vehicle signal.

11. A fluid application system according to claim 10 wherein said sensor is a light-based sensor and said second sensor is an ultrasonic sensor.

12. A stationary fluid application system for a vehicle driven by an operator comprising:
    a first fluid source;
    a second fluid source;
    a pump in fluid communication with said first and second fluid sources for delivering a mixture of said first and second fluids;
    a spray unit comprising a boom supporting a nozzle at a first end, said boom configured to support said nozzle over a detected vehicle, said nozzles in fluid communication with said pump;
    a sensor adapted to output a vehicle detection signal in response to vehicle movement under the control of the vehicle operator; and
    a controller in operative communication with said sensor and said pump, said controller adapted to receive said vehicle detection signal, delay a first time period during which time said spray unit is Inactive and said vehicle is moving under operator control, and activate said pump for a second time period to deliver said fluid source by way of said nozzle to a detected vehicle as a function of said vehicle detection signal.

13. A fluid application system according to claim 12 comprising a selectable valve between said first fluid source and said pump, said valve responsive to a valve control signal for modifying a flow rate of said first fluid source to said pump.

14. A fluid application system according to claim 13 wherein said valve is operable at first and second flow rates and said controller is adapted to output said valve control signal to said valve in response to said vehicle detection signal such that first and second ratios of first and second fluid mixtures is delivered to said nozzles.

15. A fluid application system according to claim 14 wherein said vehicle detection signal includes a type of vehicle indicator.

16. A fluid application system according to claim 14 wherein said boom includes first and second fluid conduits between said pump and said nozzle, said first fluid conduit for communicating said first ratio of fluid mixture and said second conduit for communicating said second ratio of fluid mixture.

17. A fluid application system according to claim 12 wherein said first time period is between approximately 3 and 10 seconds.

18. A fluid application system according to claim 17 wherein said second time period is between approximately 15 and 90 seconds.

19. A fluid application system according to claim 12 comprising three nozzles.

20. A fluid application system according to claim 19 wherein each of said nozzles are rotating nozzles.

21. A fluid application system according to claim 12 wherein said first and second fluid sources each include a reservoir.

22. A fluid application system according to claim 12 comprising a second sensor for communicating a type of vehicle signal, and said controller is adapted to activate said pump as a function of said detected vehicle signal and said type of vehicle signal.

23. A fluid application system according to claim 12 wherein said sensor is a light-based sensor and said second sensor is an ultrasonic sensor.

24. A fluid application system according to claim 12 wherein said first fluid source, pump, and controller are mounted on a portable structure and said spray unit boom, at a second end, is connected to said portable structure.

25. In a stationary fluid application system including a controller, pump and spray unit, a method of applying a fluid mixture to a vehicle comprising:
   receiving a vehicle detection signal from a first sensor indicating the presence of a vehicle under said spray unit, said vehicle movement being controlled by a vehicle operator;
   delaying a first time period during which time said spray unit is inactive and said vehicle is moving under operator control;
   activating said pump for a second time period to deliver a fluid mixture to said spray unit as a function of said vehicle detection signal, said second time period being a function of a profile of said detected vehicle signal.

26. A method according to claim 25 further comprising delaying a third time period before receiving another vehicle detection signal.

27. A method according to claim 25 wherein said first time period is between approximately 3 and 10 seconds and said second time period is between approximately 15 and 90 seconds.

28. A method according to claim 25 further comprising setting a valve, in-line with said first fluid source and upstream of said pump, to a selectable position to provide a predetermined fluid mixture ratio to said spray unit.

29. A method according to claim 25 further comprising receiving a vehicle profile signal from a second sensor and wherein activating said pump includes activating said pump as a function of said vehicle detection signal and said vehicle profile signal.

30. A method according to claim 29 wherein activating includes, when said vehicle detection signal indicates the presence of a vehicle under said spray unit and said vehicle profile signal indicates an object between approximately 4 and 5.5 feet above a ground level, turning on said pump.

31. A stationary fluid application system for vehicle driven by an operator comprising:
   a fluid source;
   a control valve in fluid communication with said fluid source;
   a spray unit comprising a boom supporting at least one rotary nozzle at a first end, said boom configured to support said nozzle over a detected vehicle, said nozzles in fluid communication with said control valve;
   a sensor adapted to output a vehicle detection signal in response to vehicle movement under the control of the vehicle operator; and
   a controller in operative communication with said sensor and said control valve, said controller adapted to receive said vehicle detection signal, and activate said control valve to deliver said fluid source by way of said rotary nozzle to a detected vehicle while said vehicle is moving under the control of the vehicle operator.

32. A fluid application system according to claim 31 wherein said fluid source comprises a first and second fluid sources in fluid communication with said control valve, said control valve responsive to a control signal for communicating a mixture of said first and second fluid sources to said spray unit.

33. A fluid application system according to claim 32 comprising a selectable valve between said first fluid source and said control valve, said selectable valve responsive to a valve signal for modifying a flow rate of said first fluid source to said control valve.

34. A fluid application system according to claim 33 wherein said selectable valve is operable at first and second flow rates and said controller is adapted to output said valve signal in response to said vehicle detection signal such that first and second ratios of first and second fluid mixtures is delivered to said nozzles.

35. A fluid application system according to claim 34 wherein said boom includes first and second fluid conduits between said control valve and said nozzle, said first fluid conduit for communicating said first ratio of fluid mixture and said second conduit for communicating said second ratio of fluid mixture.

36. A fluid application system according to claim 31 comprising three rotary nozzles.

37. A fluid application system according to claim 31 wherein said at least one rotary nozzle is an oscillating nozzle.

38. A fluid application system according to claim 31 wherein said fluid source, control valve and controller are mounted on a portable structure and said spray unit boom, at a second end, is connected to said portable structure.

* * * * *